US 6,575,404 B2

(12) United States Patent
Demay et al.

(10) Patent No.: US 6,575,404 B2
(45) Date of Patent: Jun. 10, 2003

(54) AIR INTAKE AND FLYING DEVICE, PARTICULARLY A MISSILE, EQUIPPED WITH SUCH AN AIR INTAKE

(75) Inventors: Jean-Paul Demay, Fresnes (FR); Laurent Carton, Saint-Florent sur Cher (FR)

(73) Assignee: Medam F, Paris (FR)

( * ) Notice: Subject to any disclaimer, the term of this patent is extended or adjusted under 35 U.S.C. 154(b) by 0 days.

(21) Appl. No.: 10/106,209

(22) Filed: Mar. 27, 2002

(65) Prior Publication Data

US 2002/0158165 A1 Oct. 31, 2002

(30) Foreign Application Priority Data

Apr. 30, 2001 (FR) .......................................... 01 05800

(51) Int. Cl.$^7$ ............................................. B64D 33/02
(52) U.S. Cl. .................................................... 244/53 B
(58) Field of Search ............................ 244/53 B, 53 R; 137/15.1, 15.2; 60/269

(56) References Cited

U.S. PATENT DOCUMENTS

| 2,632,295 | A | * | 3/1953 | Price |
| 3,242,671 | A | * | 3/1966 | Moorehead |
| 3,535,882 | A | * | 10/1970 | Tizio et al. |
| 3,589,379 | A | | 6/1971 | Daues |
| 4,121,606 | A | * | 10/1978 | Holland et al. |
| 4,477,039 | A | * | 10/1984 | Boulton et al. |
| 5,078,341 | A | | 1/1992 | Bichler et al. |

FOREIGN PATENT DOCUMENTS

| DE | 3003004 | | 7/1981 | |
| EP | 0474594 | | 3/1992 | |
| EP | 0646525 | | 4/1995 | |
| FR | 90723 | * | 12/1967 | ............... 244/53 B |
| FR | 2755182 | | 4/1998 | |
| GB | 870182 | | 6/1961 | |
| JP | 2000-192850 | * | 7/2000 | |

OTHER PUBLICATIONS

Patent Abstracts of Japan, vol. 2000, No. 10, Nov. 17, 2000 & JP 2000 192850 A (Kawasaki Heavy Ind Ltd), Jul. 11, 2000.

* cited by examiner

Primary Examiner—Tien Dinh
(74) Attorney, Agent, or Firm—Stevens, Davis, Miller & Mosher, LLP

(57) ABSTRACT

Air intake and flying device, particularly a missile, equipped with such an air intake.

The air intake (1) consisting an elongate duct (4) equipped with at least one roughly planar face (7A), and a moving ramp (8) which is arranged on the outside on the planar face (7A) of the duct (4) and which can be moved in translation over said planar face (7A) along the duct (4) and brought into one of two stable positions, namely a retracted position in which it is set back from the air inlet end (5) of the duct (4) on the planar face (7A) of the duct (4), and a deployed position in which, while being partially arranged on said planar face (7A), it protrudes beyond the duct (4) at its air inlet end (5).

5 Claims, 4 Drawing Sheets

AIR INTAKE AND FLYING DEVICE, PARTICULARLY A MISSILE, EQUIPPED WITH SUCH AN AIR INTAKE

BACKGROUND OF THE INVENTION

The present invention relates to an air intake, and to a flying device, particularly a missile, equipped with such an air intake.

It is known that an air intake which is mounted on a flying device such as a missile for example, is intended to convey air, in flight, from outside the flying device to internal means, generally means intended to propel said flying device, such as a ramjet combustion chamber for example. Such air intakes are described in numerous documents, particularly in patents FR-2 755 182, DE-30 03 004 and EP-0 474 594, and generally comprise an elongate duct of roughly rectangular cross section.

In the case of a ramjet, it is known that the quality of operation of the ramjet and its efficiency depend to a large extent on the magnitude of the ingested air flow rate, that is to say on the flow rate of air conveyed by the air intake or intakes into the ramjet combustion chamber, in which a mixture of air and fuel is burnt. The ingested air flow rate of course depends on the planned cross-sectional area of the air intake (or air intakes). Of course, the larger this area, the greater the flow rate.

However, it is not desirable to provide a flying device with excessively large air intake cross-sectional areas, particularly for size, mass and aerodynamic reasons.

In addition, particularly when intended to supply air to propulsion means of the ramjet type, an air intake has to have good performance, in terms of efficiency and flow rate, in a broad flight envelope, and be suited to the Mach number and the flight altitude.

What happens is that low-altitude flights can be envisaged only at modest Mach numbers, for material temperature withstand reasons, whereas at high altitude, the Mach number needs to be much higher so as, because of the rarefaction of the air, to make it possible to maintain sufficient dynamic pressure to provide the flying device with lift and/or acceleration.

Hence, to obtain high thrust over the entire trajectory of the aerial vehicle, both at low altitude and at high altitude, it is necessary to provide the propulsion means with a very variable flow rate of combustion air.

DESCRIPTION OF THE PRIOR ART

To achieve this objective, one known solution is to vary the inlet cross section of the air intake. Various air intakes with variable air inlet cross sections are known. In particular, patent EP-0 646 525 discloses a variable-geometry two-dimensional supersonic and hypersonic air inlet for the combustion air of an aircraft engine. This air inlet is placed under the wing structure or the fuselage of the aircraft, and comprises two main flaps arranged facing each other, of which the internal walls, facing each other, are arranged as compression ramps. Each of said flaps can move about an axis of pivoting situated near a wall of the air inlet which continues the relevant main flap backward. In addition, a ramp, which can move about an axis of pivoting parallel to the axes of pivoting of the main flaps, and situated near its leading edge, is arranged upstream of the main flap closest to the wing structure or fuselage. This upstream ramp together with said main flap delimits a boundary layer bleed of variable cross section.

Such an air inlet has the advantage that the orientable upstream ramp diverts the air flow toward the central plane of the air inlet and makes it possible to form, and to maintain, right up to the superramjet operating phase, a boundary layer bleed of variable cross section of a satisfactory size.

However, since the main flaps and the upstream ramp, and the actuating means, are arranged inside the air inlet, they, of necessity, disrupt the flow. In addition, as this known solution envisages a high number of different elements (main flaps, ramp, etc.), it is complicated, bulky and expensive. Furthermore, because of the high pressure generated by the air at high flow rate which enters the air inlet and because of the means of attachment provided, comprising just two attachment regions (pivot and actuator) for each of these pivoting elements, there is doubt over the stability of these elements throughout the flight envelope.

SUMMARY OF THE INVENTION

It is an object of the present invention to overcome these drawbacks. The invention relates to an air intake which is simple, efficient, and low-cost, allowing air to be conveyed at a variable flow rate.

To this end, according to the invention, said air intake of the type comprising an elongate duct which has an air inlet end and an air outlet end and which has at least one roughly planar face, is notable in that it further comprises:

a moving ramp comprising an elongate structure which is, at least in part, roughly planar face which is arranged on the outside on said planar of the duct, and which is able to be moved in translation over said planar face along said duct and be brought into one of at least two stable positions in which it is stationary with respect to said duct:

a retracted position, in which it is set back from said air inlet end, on said planar face of the duct; and a deployed position in which, while being partially arranged on said planar face, it protrudes from the duct at its air inlet end; and operable actuating means for moving said moving ramp and bringing it into one of said stable positions.

Thus, by virtue of the invention, for the same condition of use of the air intake, it is possible to obtain two different air flow rates, depending on the position (retracted or deployed) into which the moving ramp is brought. Specifically:

in the retracted position, the ramp is set back from the air inlet end of the duct and therefore has no influence on the air entering the air intake, which means that the air flow rate is defined by the (constant) cross section of said air inlet end, and, of course, by the conditions of use (air speed, etc.);

whereas, in the deployed position, the ramp protrudes beyond the duct at its (air) inlet end, which means that it acts on the air upstream of said inlet end and guides some of this air toward said inlet end in such a way as to increase the amount of air entering the air intake, and the pressure, which has the effect of increasing the air flow rate (by comparison with the flow rate there is in the retracted position).

In consequence, depending on the air flow rate needed, the ramp is brought into one or other of said stable positions.

In addition, since the ramp is arranged on the external face of said planar face of the duct, it does not disrupt the air flow inside the air intake.

Furthermore, as will be seen in greater detail hereinbelow, the present invention also has the following advantages:

it is compact;

the ramp is moved precisely; and the ramp is very stable in its retracted and deployed positions.

It will be noted that, in the context of the present invention, it is of course conceivable to provide more than two stable positions by providing one or more (deployed) stable positions which are intermediate between the retracted position and the fully deployed position.

In a preferred embodiment, said actuating means comprise:

a system involving collaborating rail and slide, which is intended to secure the ramp to said duct, while at the same time allowing said ramp to move; and means of moving and fixing said moving ramp.

This makes it possible to obtain (retracted and deployed) positions which are very stable and controlled and also stable movement of the ramp, particularly by comparison with the aforementioned customary solution (patent EP-0 646 525 for example) in which the elements (flap, ramp) acting on the air are pivotable (rather than movable in translation) and are held generally at just two points, at a pivot and at an actuator.

Furthermore, advantageously, said means of moving and fixing the moving ramp comprise:

a geared motor unit, of conventional type, which can be operated electrically, and is able to move the moving ramp with the aid of an assembly formed of a rack and of a pinion, so as to convey it into one of said stable positions, and able to fix said ramp with respect to said duct in one of said stable positions; and operating means for electrically operating said geared motor unit.

This embodiment has, in particular, the following advantages:

absence of maintenance (no operations such as changing seals or performing major periodic inspections, for example, as is the case with a hydraulic system);

long life; and possibility of multiple uses (unlike a pyrotechnic system for example).

In this case, as a preference, said operating means for electrically operating said geared motor unit are connected by an electric connection to the latter and are arranged some distance from said geared motor unit. As a consequence, only the geared motor unit which needs to be arranged near the ramp in order to be able to operate and act as envisaged is potentially bulky, it being possible for the operating means for their part to be arranged at a point where they cause no impediment.

Furthermore, advantageously, said ramp comprises a planar first part intended to be arranged on said planar face of the duct and at least one second part which is connected to said planar first part roughly at right angles and which has at least one through-opening which, when the ramp is in said deployed position, is situated beyond the duct at the air inlet end. This opening allows a boundary layer of air to be removed.

The present invention relates also to a flying device, particularly a missile, comprising at least one air intake for conveying air from the outside into said flying device, particularly to propulsion means such as a ramjet for example.

According to the invention, said flying device is notable in that said air intake is of the aforementioned type.

BRIEF DESCRIPTION OF THE FIGURES

The figures of the appended drawing will make it easy to understand how the invention may be embodied. In these figures, identical references denote similar elements.

DESCRIPTION OF THE PREFERRED EMBODIMENT(S)

Figure 1:
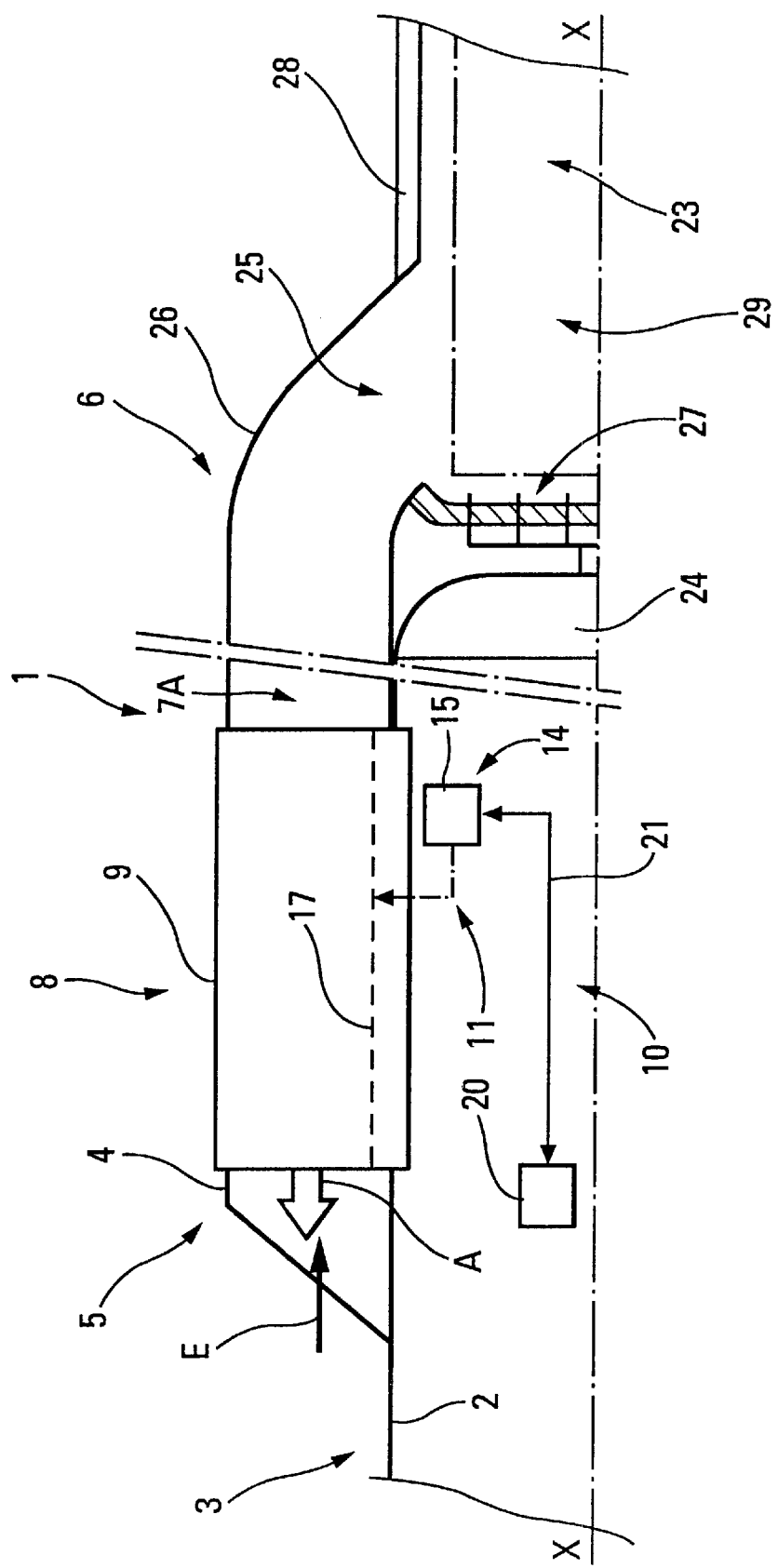
FIG. 1 schematically and partially shows a flying device equipped with an air intake according to the invention.
Figure 2:
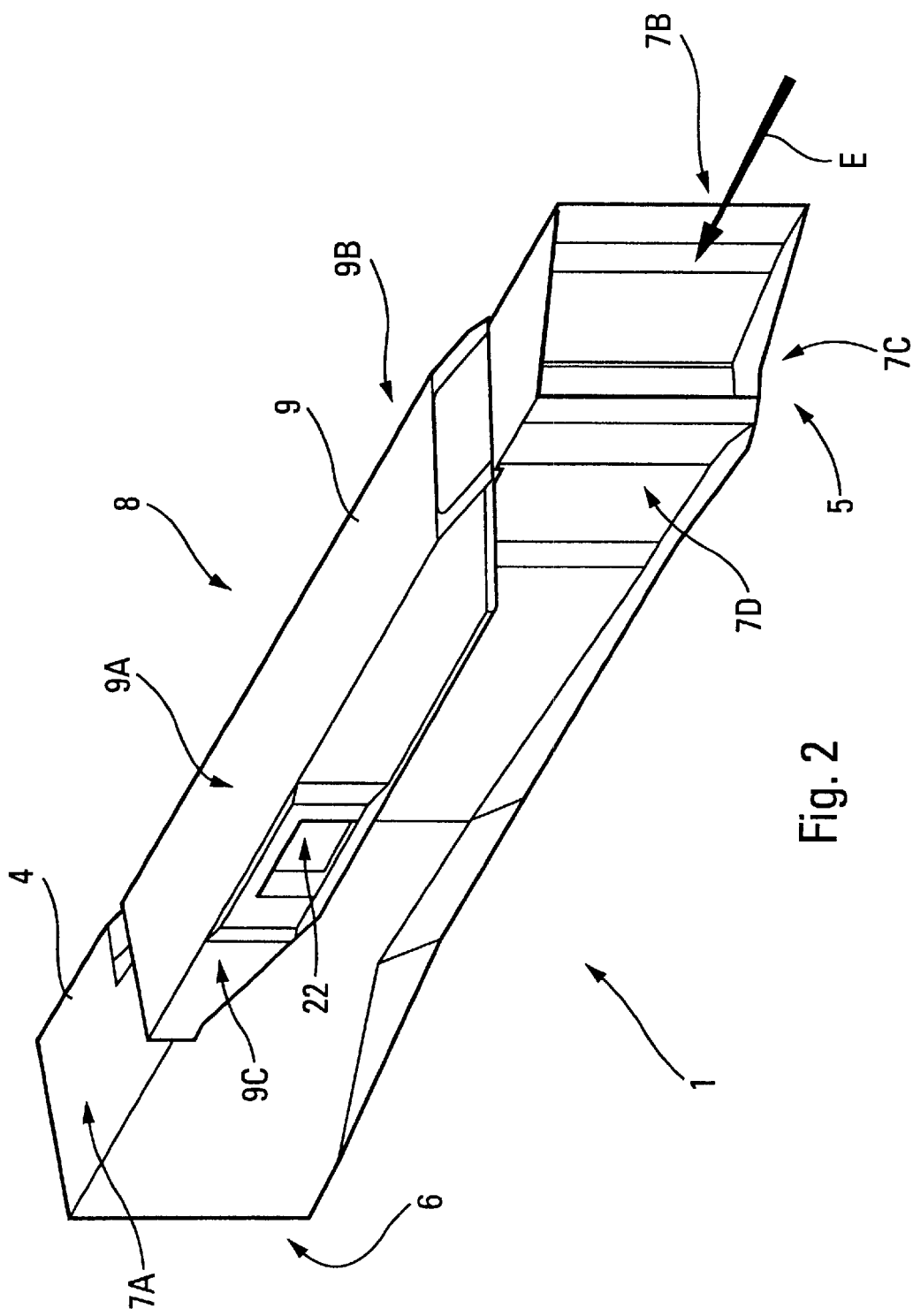
FIGS. 2 and 3 are schematic perspective views of an air intake comprising a moving ramp which is situated in a retracted position and in a deployed position, respectively.
Figure 3:
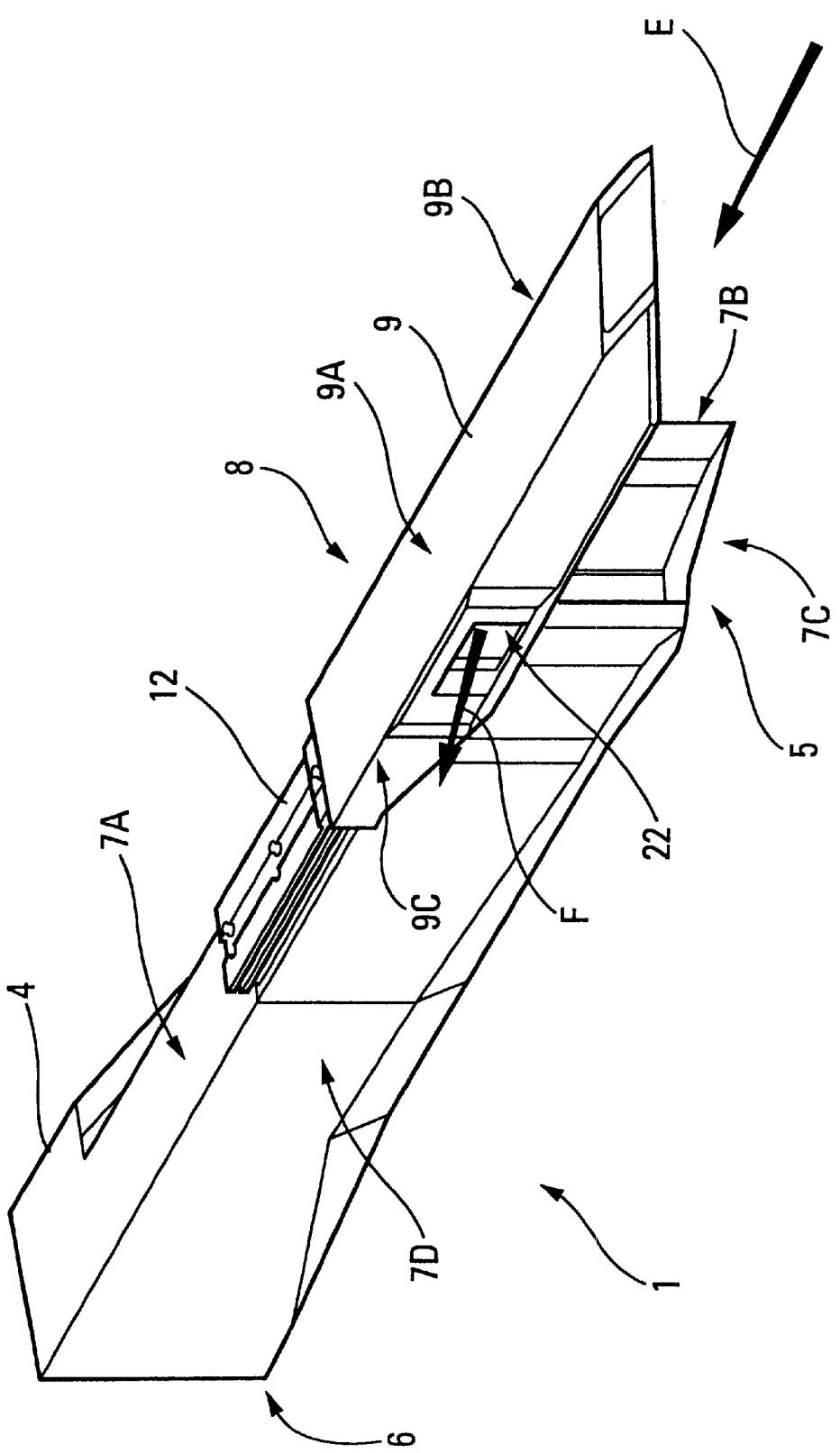

The air intake 1 according to the invention and depicted schematically in FIGS. 1 to 3 is mounted on the structure 2 (fuselage, wing structure, etc.) of a device 3, particularly a flying device such as a missile, and is intended to convey air from the outside of said device 3 to the inside of its structure 2, particularly to supply the combustion chamber of an engine of the device 3.

Said air intake 1 comprises, in the known way, an elongate duct 4, for example made of metal, which has an air inlet end 5 and an air outlet end 6 and which comprises at least one roughly planar face 7A.

The cross section of said duct 4 may be of any shape. However, in a preferred embodiment depicted in FIGS. 2 and 3, said duct 4 has a roughly rectangular cross section and comprises four roughly planar faces 7A, 7B, 7C, 7D. The duct 4 is fixed by the face 7B to the structure 2. It is also conceivable, in the context of the present invention, although not depicted, for the structure 2 of the device 3 to constitute or directly form a face (face 7B) of the duct 4.

According to the invention, said air intake 1 additionally comprises:

a moving ramp 8 comprising an elongate structure 9 which comprises at least one planar part 9A which is arranged on the outside on said planar face 7A and which is able to be moved in translation over said planar face 7A along said duct 4 and be conveyed into one of two stable positions in which it is stationary with respect to said duct 4, namely:

a retracted position depicted in FIG. 2, in which it is set back from said air inlet end 5, on the planar face 7A of the duct 4; and a deployed position depicted in FIG. 3, in which, while being partially arranged on said planar face 7A, it protrudes beyond the duct 4 at its air inlet end 5; and operable actuating means 10 for moving said moving ramp 8 and bringing it into one of said stable positions.

To bring the moving ramp 8 from the retracted position into the deployed position, the means 10 move it in the direction illustrated by an arrow A depicted in FIG. 1.

Thus, by virtue of the invention, for the same condition of use of the air intake 1, it is possible to obtain two different air flow rates, depending on the position (retracted or deployed) occupied by the moving ramp 8. Specifically:

in the retracted position (FIG. 2), the ramp 8 is set back from the air inlet end 5 of the duct, and therefore does not influence the air entering the air intake 1, as depicted by an arrow E in FIGS. 1 to 3, which means that the air flow rate is defined by the (constant) cross section of said air inlet end 5 of the duct 4, and, of course, by the conditions of use (air speed, etc.);

whereas, in the deployed position (FIG. 3), the ramp 8 protrudes beyond the duct 4 at its inlet end 5 which means that it acts on the air upstream (in the direction of the arrow E) of said inlet end 5 and guides some of this air toward said inlet end 5 so as to increase the amount of air entering the intake 1, and the pressure, which has the effect of increasing the air flow rate (by comparison with the flow rate there is in the retracted position).

In consequence, the ramp 8 is brought into one or other of said stable positions according to the air flow rate needed or desired.

In addition, since the ramp 8 is arranged on the external face of said planar face 7A of the duct 4, it does not disrupt the air flow inside the air intake 1.

Furthermore, as will be seen in greater detail hereinbelow, the present invention also has the following advantages:

it is compact;

the ramp 8 is moved precisely; and the ramp 8 is very stable in its retracted and deployed positions.

It will be noted that, in the context of the present invention, it is of course conceivable to provide more than two stable positions by providing one or more (deployed) stable positions which are intermediate between the retracted position of FIG. 2 and a fully deployed position, for example the position of FIG. 3.

Figure 4:
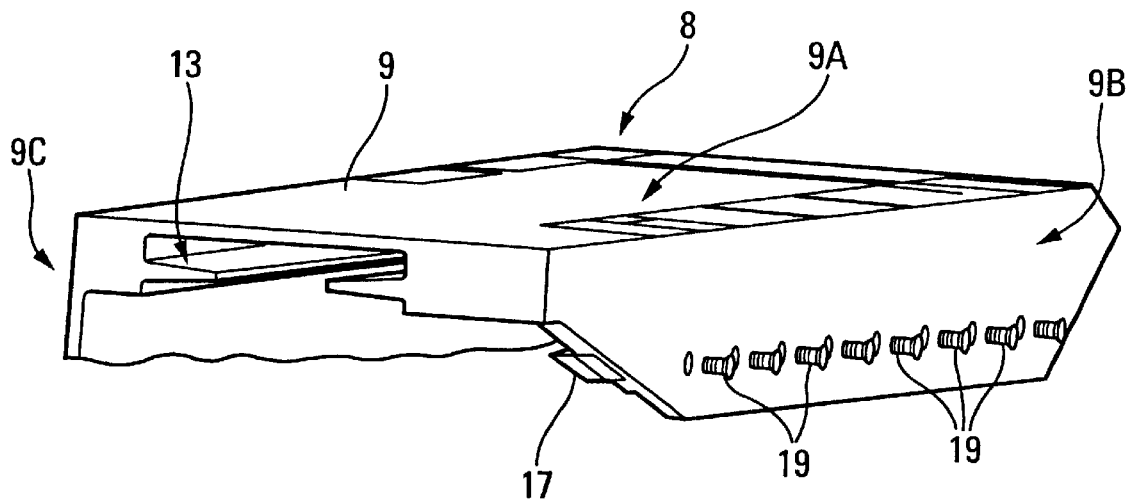
FIG. 4 is a schematic and perspective view of a moving ramp according to the invention.

According to the invention, said actuating means 10 comprise:

a system 11 intended to secure the ramp 8 to said duct 4 while at the same time allowing said ramp 8 to move. This system 11 comprises, for this purpose, a rail 12 which is fixed to the face 7A of the duct 4, as depicted in FIG. 3, and which collaborates with a slide 13 which is formed in the structure 9 of the ramp 8, as depicted partially in FIG. 4; and means 14 of moving and fixing said moving ramp 8.

Figure 5:
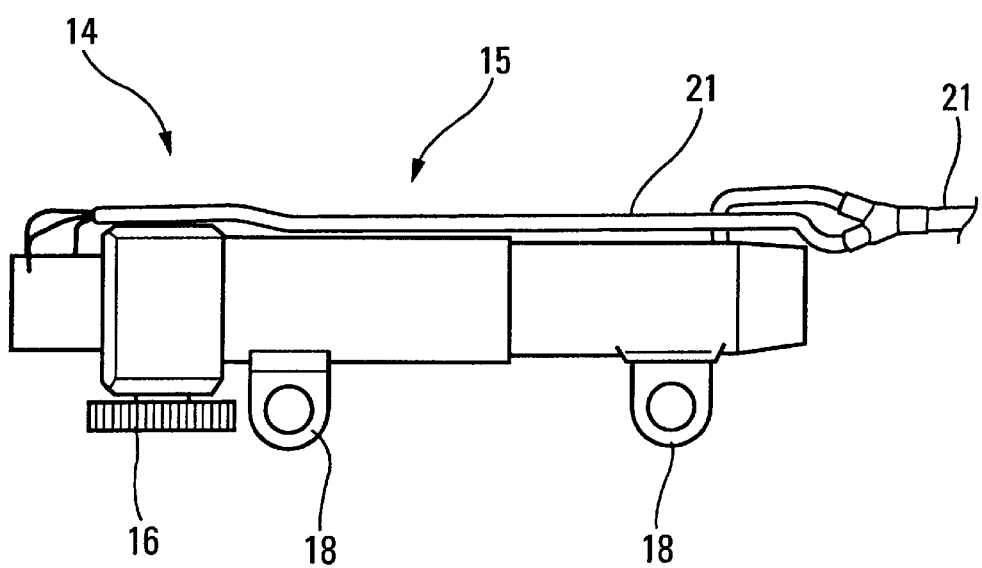
FIG. 5 schematically shows a geared motor unit intended to drive a moving ramp.

The said means 14 of moving and fixing the moving ramp 8 comprise:

a geared motor unit 15 depicted in FIG. 5, which is able to be electrically operated and which is able to move the moving ramp 8 via an assembly formed of a rack 17 and of a pinion 16, so as to bring it into one of said stable positions, and able to fix said ramp 8 with respect to said duct 4 in one of said stable positions. To this end, the geared motor unit 15 is fixed to the duct 4 of the air intake 1 by rings 18 (FIG. 5) and screws, not depicted. Said geared motor unit 15 provides rotational drive to the pinion 16 which it carries. This pinion collaborates, in the customary way, with the rack 17 which is fixed by fixing means 19 (screws, etc.) to the inside of a face (or wall) 9B of the ramp 8 (FIG. 4); and operating means 20 for electrically operating said geared motor unit 15, via an electric cable 21.

As depicted in FIG. 1, the operating means 20 are arranged some distance away from said geared motor unit 15, preferably at a point where they cause no impediment. In consequence, only the geared motor unit 15 is potentially bulky.

Of course, the operating means 20 cause the ramp 8 to move according to the air flow rate requirement. This air flow rate requirement may, in particular, depend on the speed of the device 3 and on its altitude, in the case of a flying device. The operating means 20 therefore comprise appropriate means, not depicted, for determining these various parameters and for automatically moving the ramp 8 accordingly. It is also conceivable, in a particular embodiment, for these operating means 20 to be actuable manually by an operator.

Furthermore, the ramp 8 additionally comprises, as depicted in FIGS. 2 and 3, at least one face 9C which is adjacent to the planar face 9A and which is, for example, at least partially at right angles to the latter. This face 9C has at least one through-opening 22 which acts as a boundary layer bleed when the ramp 8 is in the deployed position, as depicted by an arrow F in FIG. 3 which illustrates the ejection of air from said boundary layer.

In addition to the aforementioned advantages, the air intake 1 according to the invention additionally has, in particular, the following advantages:

no maintenance (no operations such as changing seals or performing major periodic inspections, as is the case with a hydraulic system);

long life; and possibility of multiple use (unlike a pyrotechnic system for example).

The air intake 1 according to the invention may be applied to many devices 3, moving or otherwise, for conveying air from the outside of the device 3 to the inside. However, in a preferred embodiment, the air intake 1 is applied to a flying device 3 of the missile type propelled by a ramjet, as depicted in FIG. 1.

In this case, in the known way, the (cylindrical) body 2 of the missile, of axis X—X, generally contains, among other things, the customary equipment and charges (not depicted) and a reservoir of fuel 24, intended to supply the ramjet and fixed to the rear part of said body 2. The ramjet comprises a combustion chamber 23, ending toward the rear in a jet pipe (not depicted) and connected, toward the front, to a number of air intakes 1. The air intakes 1 are arranged at the periphery of the body 2 and are secured to the latter. Each of them, toward the front, therefore has a corresponding air inlet 5 and, toward the rear, opens into the front part of the fuel chamber 23 via a corresponding orifice 25. An elbow 26 is provided in each air intake 1 to connect the part thereof that is fixed to the outer wall of the body 2 to the corresponding orifice 25 of the combustion chamber 23. Near the front part of the combustion chamber 23 there is a fuel injection device 27. The device 27 is operated by a fuel supply and regulating member (not depicted) borne by the body 2 and connected to the reservoir 24. In addition, thermal protective coating 28 is provided on the interior walls of the combustion chamber 23. The flying device 3 may also comprise an operable auxiliary motor 29 (for example powder) for propelling said flying device 3 prior to operation in ramjet mode. The way in which such a flying device or missile 3 works (and to which the invention does not relate) is the customary and known one and is therefore not described further.

What is claimed is:

1. An air intake for conveying air, said air intake comprising:

an elongate duct which has an air inlet end and an air outlet end and which has at least one roughly planar face;

a moving ramp comprising an elongate structure which is, at least in part, roughly planar and which is able to be moved in translation over said planar face along said duct; and operable actuating means for moving said moving ramp, wherein said elongate structure of the moving ramp is arranged on the outside on said planar face of the duct and wherein said moving ramp can be brought, by said actuating means, into one of two stable positions in which it is stationary with respect to said duct:

a retracted position, in which it is completely set back from said air inlet end, on said planar face of the duct; and a deployed position in which, while being partially arranged on said planar face, it protrudes from the duct at its air inlet end, wherein:

said ramp comprises a planar first part intended to be arranged on said planar face of the duct and at least one second part which is connected to said planar first part roughly at right angles and which has at least one through-opening which, when the ramp is in said deployed position, is situated beyond the duct at the air inlet end.

2. The air intake as claimed in claim 1, wherein said actuating means comprise:

a system involving collaborating rail and slide, which is intended to secure the ramp to said duct, while at the same time allowing said ramp to move; and means of moving and fixing said moving ramp.

3. The air intake as claimed in claim 2, wherein said means of moving and fixing the moving ramp comprise:

a geared motor unit which can be operated electrically, and is able to move the moving ramp with the aid of an assembly formed of a rack and of a pinion, so as to convey it into one of said stable positions, and able to fix said ramp with respect to said duct in one of said stable positions; and operating means for electrically operating said geared motor unit.

4. The air intake as claimed in claim 3, wherein said operating means for electrically operating said geared motor unit are connected by an electric connection to said geared motor unit and are arranged some distance from said geared motor unit.

5. A flying device, particularly a missile, comprising at least one air intake for conveying air from the outside into said flying device, wherein said air intake is as specified in claim 1.

* * * * *

UNITED STATES PATENT AND TRADEMARK OFFICE
CERTIFICATE OF CORRECTION

PATENT NO.    : 6,575,404 B2
DATED         : June 10, 2003
INVENTOR(S)   : Demay et al.

It is certified that error appears in the above-identified patent and that said Letters Patent is hereby corrected as shown below:

<u>Title page,</u>
Item [73], Assignee, "Medam F, Paris (FR)" should read -- MBDAM, Paris (FR) --

Signed and Sealed this

Twenty-third Day of September, 2003

JAMES E. ROGAN
*Director of the United States Patent and Trademark Office*